United States Patent
Min et al.

(10) Patent No.: US 12,343,772 B2
(45) Date of Patent: Jul. 1, 2025

(54) AIR HOUSING APPARATUS FOR PROTECTING LENS OF VEHICLE-INSTALLED OPTICAL DEVICE

(71) Applicant: Korea Electronics Technology Institute, Seongnam-si (KR)

(72) Inventors: Kyoung Won Min, Seongnam-si (KR); Haeng Seon Son, Seongnam-si (KR); Seon Young Lee, Seoul (KR); Young Bo Shim, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 602 days.

(21) Appl. No.: 17/623,065

(22) PCT Filed: Mar. 31, 2021

(86) PCT No.: PCT/KR2021/003966
§ 371 (c)(1),
(2) Date: Dec. 27, 2021

(87) PCT Pub. No.: WO2021/201583
PCT Pub. Date: Oct. 7, 2021

(65) Prior Publication Data
US 2022/0266314 A1   Aug. 25, 2022

(30) Foreign Application Priority Data

Apr. 1, 2020   (KR) .................. 10-2020-0039772

(51) Int. Cl.
*B08B 5/02*   (2006.01)
*B60S 1/56*   (2006.01)
(Continued)

(52) U.S. Cl.
CPC .................. *B08B 5/02* (2013.01); *B60S 1/56* (2013.01); *G02B 27/0006* (2013.01); *G01S 2007/4977* (2013.01)

(58) Field of Classification Search
CPC ......... B08B 5/02; B60S 1/56; G02B 27/0006; G01S 2007/4977
(Continued)

(56) References Cited

U.S. PATENT DOCUMENTS 10,549,723 B2 *   2/2020   Baldovino ........... G01N 21/958
11,155,243 B2 *  10/2021   Keller ..................... B60S 1/481
(Continued)

FOREIGN PATENT DOCUMENTS

KR   101848464   *   5/2018

*Primary Examiner* — Ricky D Shafer
(74) *Attorney, Agent, or Firm* — NSIP Law

(57) ABSTRACT

Provided is an air housing apparatus for protecting, from contamination, scratches, damage and the like, a lens and a cover glass which affect the performance of an optical device installed on a vehicle such as a camera and LIDAR. The air housing apparatus according to an embodiment of the present invention comprises: a cover into which high pressure air is fed; an air guide for injecting the supplied high pressure air toward the front surface of a lens or a sensor; and an air housing provided so as to connect the cover and the air guide and transferring the high pressure air supplied from the cover to the air guide. Therefore, a lens, sensor, or cover glass of a vehicle-installed optical device such as a camera and LIDAR can be continually protected from contamination and scratches by means of the injected air. In addition, energy efficiency can be enhanced by controlling the discharge pressure of air provided by an air pressure generation apparatus on the basis of information relating to the running speed and RPM of the vehicle or the air flow direction and air flow velocity.

9 Claims, 7 Drawing Sheets

(51) Int. Cl.
  *G02B 27/00* (2006.01)
  *G01S 7/497* (2006.01)
(58) Field of Classification Search
  USPC .......................................................... 359/509
  See application file for complete search history.

(56) References Cited

U.S. PATENT DOCUMENTS

| | | | |
|---|---|---|---|
| 2011/0073142 A1* | 3/2011 | Hattori | B60S 1/481 |
| | | | 134/198 |
| 2015/0277111 A1* | 10/2015 | Bell | B60S 1/54 |
| | | | 359/509 |
| 2018/0186342 A1* | 7/2018 | Kubota | B08B 5/02 |
| 2018/0290632 A1* | 10/2018 | Rice | B60S 1/56 |
| 2019/0037113 A1* | 1/2019 | Irie | G02B 27/0006 |
| 2019/0202407 A1* | 7/2019 | Jia | B60S 1/486 |
| 2020/0128153 A1* | 4/2020 | Hartranft | B60S 1/52 |
| 2020/0188965 A1* | 6/2020 | Monrad | B60S 1/20 |
| 2020/0307524 A1* | 10/2020 | Morita | B05B 1/323 |
| 2021/0146406 A1* | 5/2021 | Sykula | G01S 7/4813 |
| 2021/0179032 A1* | 6/2021 | Vitanov | B08B 3/02 |
| 2021/0181501 A1* | 6/2021 | Glover | G02B 27/0006 |

* cited by examiner

AIR HOUSING APPARATUS FOR PROTECTING LENS OF VEHICLE-INSTALLED OPTICAL DEVICE

CROSS REFERENCE TO RELATED APPLICATIONS

This application is a U.S. National Stage Application of International Application No. PCT/KR2021/003966, filed on Mar. 31, 2021, which claims the benefit under 35 USC 119(a) and 365(b) of Korean Patent Application No. 10-2020-0039772, filed on Apr. 1, 2020, in the Korean Intellectual Property Office, the entire disclosure of which is incorporated herein by reference for all purposes.

TECHNICAL FIELD

The present disclosure relates to an air housing apparatus, and more particularly, to an air housing apparatus for protecting a lens of an optical device mounted in a vehicle, such as a camera, LiDAR, or the like.

BACKGROUND ART

An advanced driver assistance system ('ADAS'), which is a system for assisting a driver in driving a vehicle, is currently applied to various fields, and, due to the expanding market for autonomous driving, various autonomous vehicle-related technologies are being developed.

Compared to a camera for the ADAS system, which is normally mounted on a backside of a windshield of a vehicle, a sensor of an autonomous vehicle may be mounted on a roof, a fender, and a side-view mirror of the vehicle, with a camera or LiDAR being exposed to the outside.

However, such an optical sensor as a camera which collects visible light and analyzes a shape, or LiDAR which analyzes a 3D shape through information received by emitting lasers, may be vulnerable to contamination of a lens or cover glass, and thus, when contamination becomes serious, contamination may be a major cause for degradation of performance of the sensor and malfunction.

To solve this problem, a related-art method detects contamination when contamination occurs, and removes a contamination source by spraying a cleaning solution or blowing air onto the lens through a narrow nozzle.

However, this method may have a problem that contamination is removed automatically or manually only when contamination of a predetermined level or more occurs on a lens.

The method of spraying the cleaning solution, which is the most effective method for removing the contamination source, may have a problem that, when the cleaning solution is sprayed during driving, it is difficult to stably receive the result of sensing by the corresponding sensor until the cleaning solution is dried.

In addition, such an exposed lens may be used, and, when an autonomous vehicle travels on a road, foreign substances such as sand on the road may fly to the lens or cover glass, causing scratches on the camera lens or cover glass, which in turn causes the sensor not to exactly recognize objects.

For this reason, dome-like cover glass may be mounted on the camera to guarantee a viewing angle and to solve degradation. However, the dome-like glass may prevent contamination and degradation, but there may be still a problem that collected information is distorted due to a refraction of light.

DISCLOSURE

Technical Problem

The present disclosure has been developed in order to address the above-discussed deficiencies of the prior art, and an object of the present disclosure is to provide an air housing apparatus which performs a role of a housing for regularly preventing contamination and scratches on a lens, a sensor or cover glass of an optical device, such as a camera, LiDAR, or the like mounted in a vehicle, by using sprayed air.

Technical Solution

According to an embodiment of the present disclosure to achieve the above-described object, an air housing apparatus includes: a cover configured to allow high-pressure air to be injected therethrough; an air guide configured to spray the supplied high-pressure air toward a front surface of a lens or a sensor; and an air housing provided to connect the cover and the air guide, and to deliver the high-pressure air supplied from the cover to the air guide.

In addition, the air housing apparatus according to an embodiment of the present disclosure may perform roles of cover glass and a housing for protecting the lens from contaminants by spraying the high-pressure air onto the front surface of the lens or the sensor of a vehicle-mounted optical device inserted thereinto.

In addition, the cover may include an air injection port to perform a role of a housing rear surface cover, and simultaneously, to perform a role of a connector to connect a high-pressure air pipe and the housing.

In addition, the air housing may include a housing passage provided therein and extended in a longitudinal direction to provide a transfer path of air, and the housing passage may be formed to have a diameter gradually decreasing along a transfer direction to increase a flow velocity of the transferred air.

In addition, the air guide may include a guide passage provided therein to allow the high-pressure air supplied through the air housing to pass therethrough, and simultaneously, to guide the air in a spraying direction.

In addition, the guide passage may adjust the spraying direction of the air to spray the air at an angle suitable for the optical device.

In addition, the guide passage may include a plurality of guide pins formed therein to have a predetermined slope, the plurality of guide pins being spaced apart from one another by a predetermined distance to adjust the transfer direction of the air and to suppress a vortex.

According to another embodiment of the present disclosure, an air housing system includes: an air housing apparatus configured to perform roles of cover glass and a housing for protecting a lens from contaminants by spraying high-pressure air toward a front surface of a lens or a sensor of a vehicle-mounted optical device inserted therein; an air pressure generation device connected to the air housing apparatus to provide the high-pressure air; and an air pressure control device configured to control discharge pressure of air provided by the air pressure generation device, based on information on a driving speed of the vehicle, RPM, or an air flow direction and an air flow velocity.

Advantageous Effects

According to embodiments of the present disclosure as described above, contamination and scratches on a lens, a sensor, or cover glass of an optical device such as a camera, LiDAR mounted in a vehicle can be regularly prevented by using sprayed air.

In addition, according to embodiments of the present disclosure, energy consumption efficiency can be enhanced by controlling discharge pressure of air provided by an air pressure generation device, based on information of a running speed of a vehicle, RPM or an air flow direction and an air flow velocity.

BEST MODE

Hereinafter, the present disclosure will be described in more detail with reference to the drawings.

Figure 1:
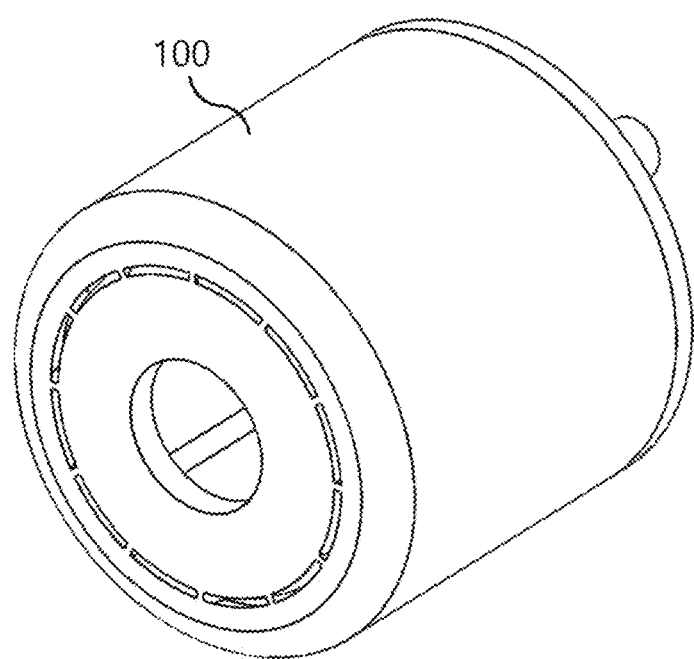
FIG. 1 is a perspective view schematically illustrating an air housing apparatus for protecting a lens of an optical device mounted in a vehicle according to an embodiment of the present disclosure.
Figure 2:
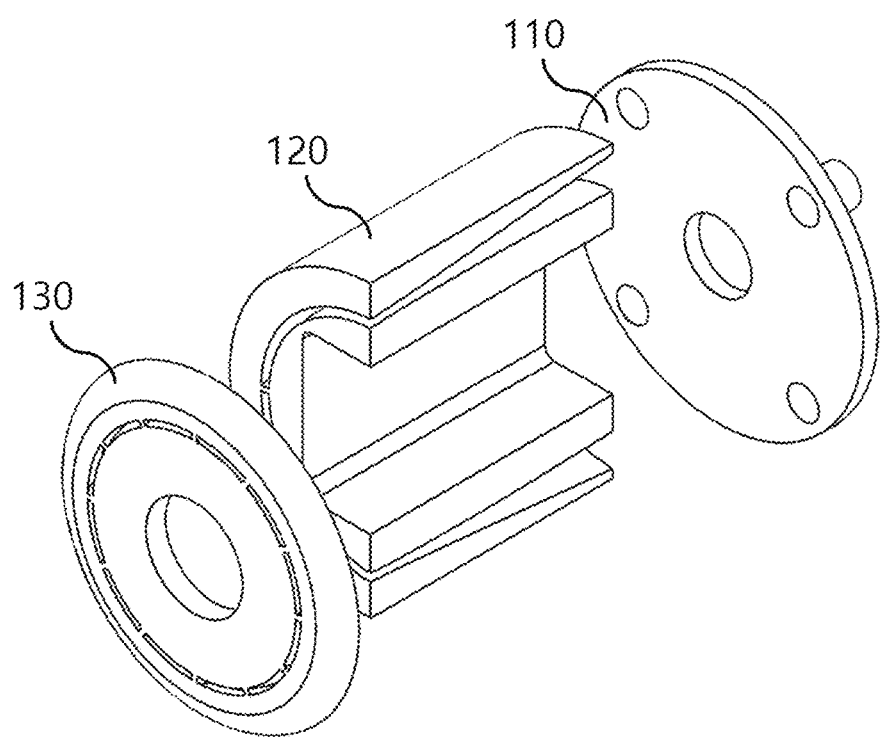
FIG. 2 is an exploded perspective view of the air housing apparatus.
Figure 3:
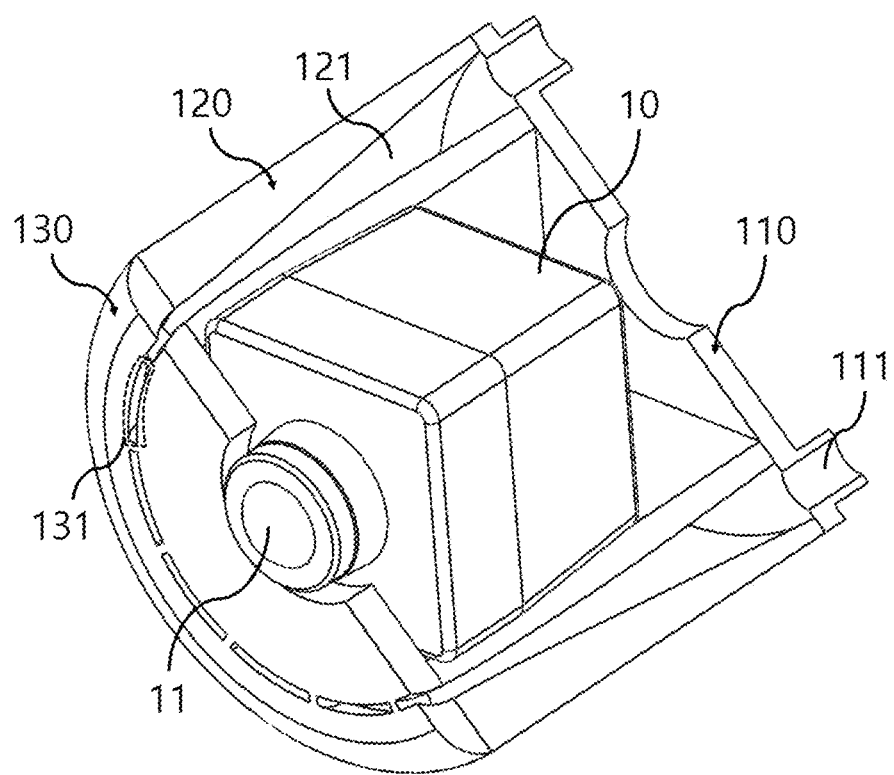
FIG. 3 is a perspective view illustrating an interior of the air housing apparatus.
Figure 4:
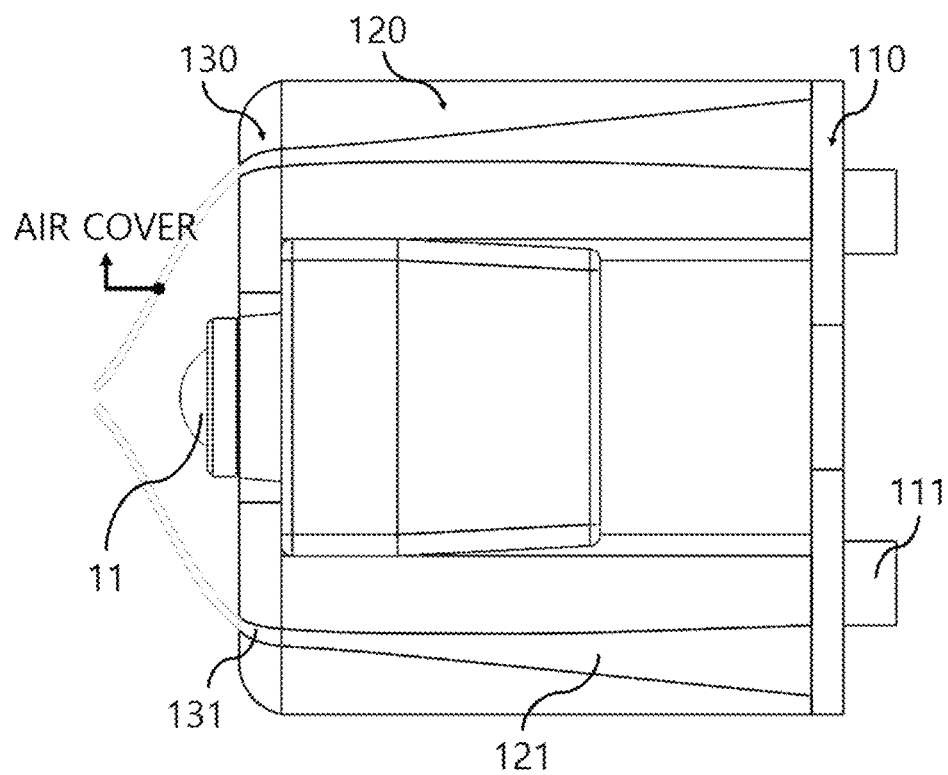
FIG. 4 is a cross-sectional view of the interior of the air housing apparatus.

FIG. 1 is a perspective view schematically illustrating an air housing apparatus 100 for protecting a lens of an optical device mounted in a vehicle (hereinafter, referred to as the "air housing apparatus") according to an embodiment of the present disclosure, FIG. 2 is an exploded perspective view of the air housing apparatus 100, FIG. 3 is a perspective view illustrating an interior of the air housing apparatus 100, and FIG. 4 is a cross-sectional view of the interior of the air housing apparatus 100.

The air housing apparatus 100 according to the present embodiment is provided to perform the role of a housing for regularly preventing contamination and scratches on a lens 11, a sensor, or cover glass of an optical device, such as a camera 10, LiDAR 20 mounted in a vehicle, by using sprayed air.

Specifically, the air housing apparatus 100 may perform roles of cover glass and a housing for protecting the lens 11 from contaminants, by spraying high-pressure air onto a front surface or an upper end of the lens 11 or the LiDAR sensor 20 of the vehicle-mounted optical device inserted thereinto.

To achieve this, the air housing apparatus 100 may include a cover 110, an air housing 120, and an air guide 130.

The cover 110 may perform the role of the rear surface cover 110 of the air housing apparatus 100, and simultaneously, may allow high-pressure air to be injected therethrough.

Specifically, the cover 110 may be provided on a rear surface or a lower end of the air housing apparatus 100, and may be provided with one or more air injection ports 111 connected with a high-pressure air pipe 220, and may perform the role of the housing rear surface cover 110, and simultaneously, may perform the role of a connector to connect the high-pressure air pipe 220 and the housing.

In this case, the number of air injection ports 111 connected with the high-pressure air pipe 220 is defined as n, and sizes, lengths, etc. may be adjusted according to technical requirements of an application field, such as an amount of requested discharge, partial pressure, etc.

The air housing 120 may deliver high-pressure supplied from the cover 110 to the air guide 130.

Specifically, the air housing 120 may be provided to connect the cover 110 and the air guide 130 and to deliver high-pressure air supplied from the cover 110 to the air guide 130.

To achieve this, the air housing 120 may include a housing passage 121 formed therein and extended along a longitudinal direction to provide a transfer path of air.

The housing passage 121 may be formed to have a diameter gradually decreasing along the transfer direction so as to increase a flow velocity of transferred air.

That is, the housing passage 121 is formed in the form of a nozzle to have a passage tapering toward a discharge port to let high-pressure air flow therethrough, and is formed to increase the flow velocity of air according to Bernoulli's equation.

The housing passage 121 may allow the high-pressure air passing through the passage of the nozzle shape and passing through an end of the housing passage 121 to spread widely and to arrive at the air guide 130.

The air guide 130 may allow the supplied high-pressure air to be sprayed to the outside, and may guide a spraying direction when spraying the high-pressure air.

Specifically, the air guide 130 may be provided on a front surface or an upper end to spray the high-pressure air toward a front surface of the lens 11 or the LiDAR sensor 20.

To achieve this, the air guide 130 may include a guide passage 131 provided therein to allow the high-pressure air supplied through the air housing 120 to pass therethrough, and simultaneously, to guide the spraying direction of the air.

The guide passage 131 may adjust the spraying direction of the air so as to spray the air at an angle suitable for the optical device.

For example, the guide passage 131 may be provided with a plurality of guide pins (not shown) formed therein to adjust the transfer direction of the air and to suppress a vortex, and may adjust the spraying direction of the sprayed air.

The guide pin (not shown) may be provided in plural number, and may be formed to have a predetermined slope, and the plurality of guide pins may be spaced apart from one another by a predetermined distance to adjust the spraying direction of the sprayed air.

That is, the plurality of guide pins may have their respective slope adjusted to refract the air passing through the guide passage 131 and to adjust the transfer direction of the air.

Figure 5:
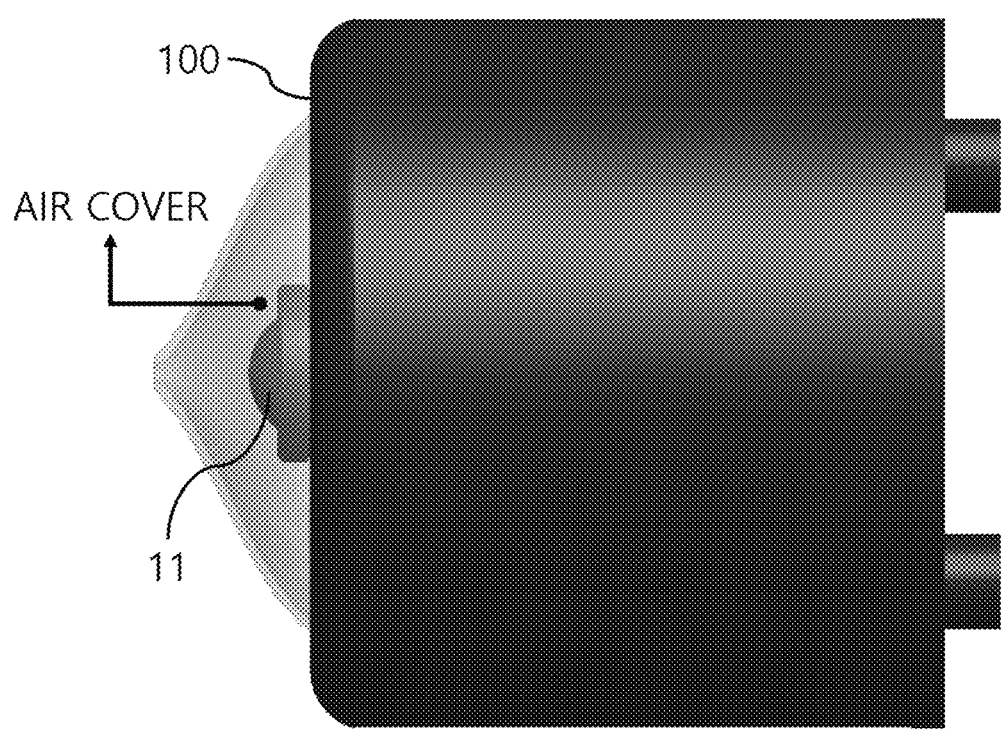
FIG. 5 is a view schematically illustrating an air cover which is generated when the air housing apparatus having a camera inserted thereinto operates.
Figure 6:
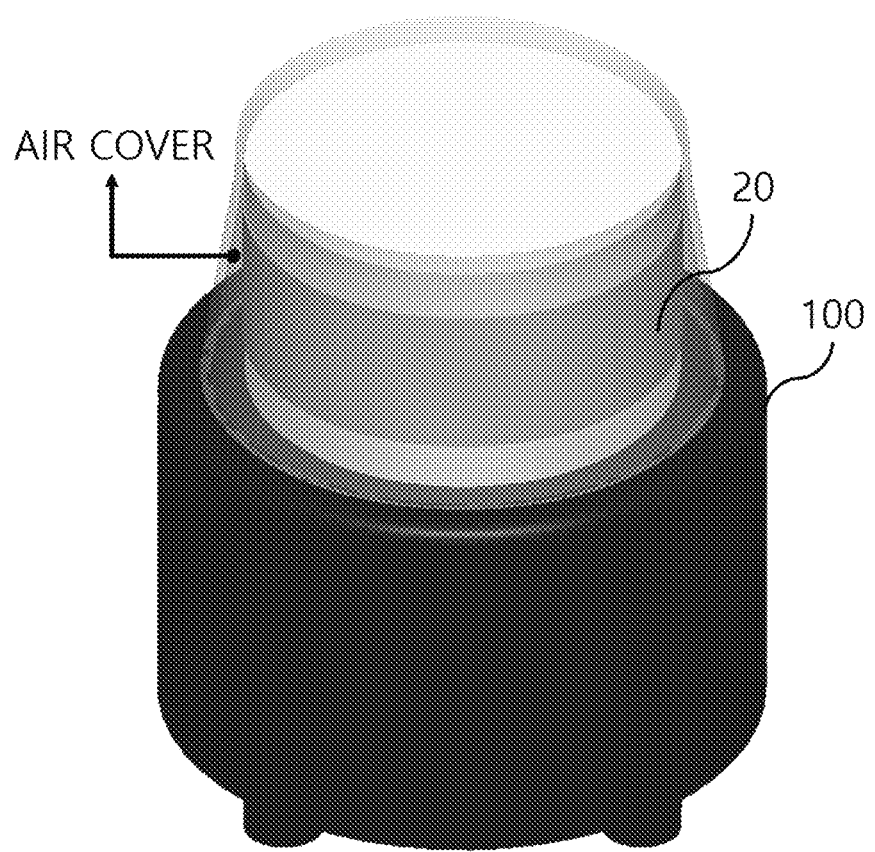
FIG. 6 is a view schematically illustrating an air cover which is generated when the air housing apparatus having LiDAR inserted thereinto operates.

The high-pressure air supplied by passing through the guide passage 131 may be sprayed to the front of the lens 11 or above the LiDAR sensor 20 as shown in FIGS. 5 and 6, and may form an air cover (air dome) of a dome shape or a conical shape, thereby finally protecting the lens 11, the cover glass of the optical device from contamination and scratches, etc.

Specifically, FIG. 5 is a view schematically illustrating an air cover which is generated when the air housing apparatus 100 having the camera 10 inserted thereinto operates, and FIG. 6 is a view schematically illustrating an air cover which is generated when the air housing apparatus 100 having the LiDAR 20 inserted thereinto operates.

In addition, the guide passage 131 may be positioned on a back side (rear surface) of the camera lens 11 or under the cover glass of the LiDAR 20 to perform the role of cover glass and a housing for protecting the lens 11 or the LiDAR sensor 20 from contaminants, without obstructing a field of vision.

In addition, changes may be made to an inner diameter of the air guide 130 and an inner diameter of the air housing 120 (a structure and a dimension for inserting the optical device), and changes may be made to an angle of the guide passage 131, such that the air housing apparatus 100 may be applied to various optical devices such as a large caliber camera 10 and LiDAR 20 to protect the lens 11 and the cover glass.

Figure 7:
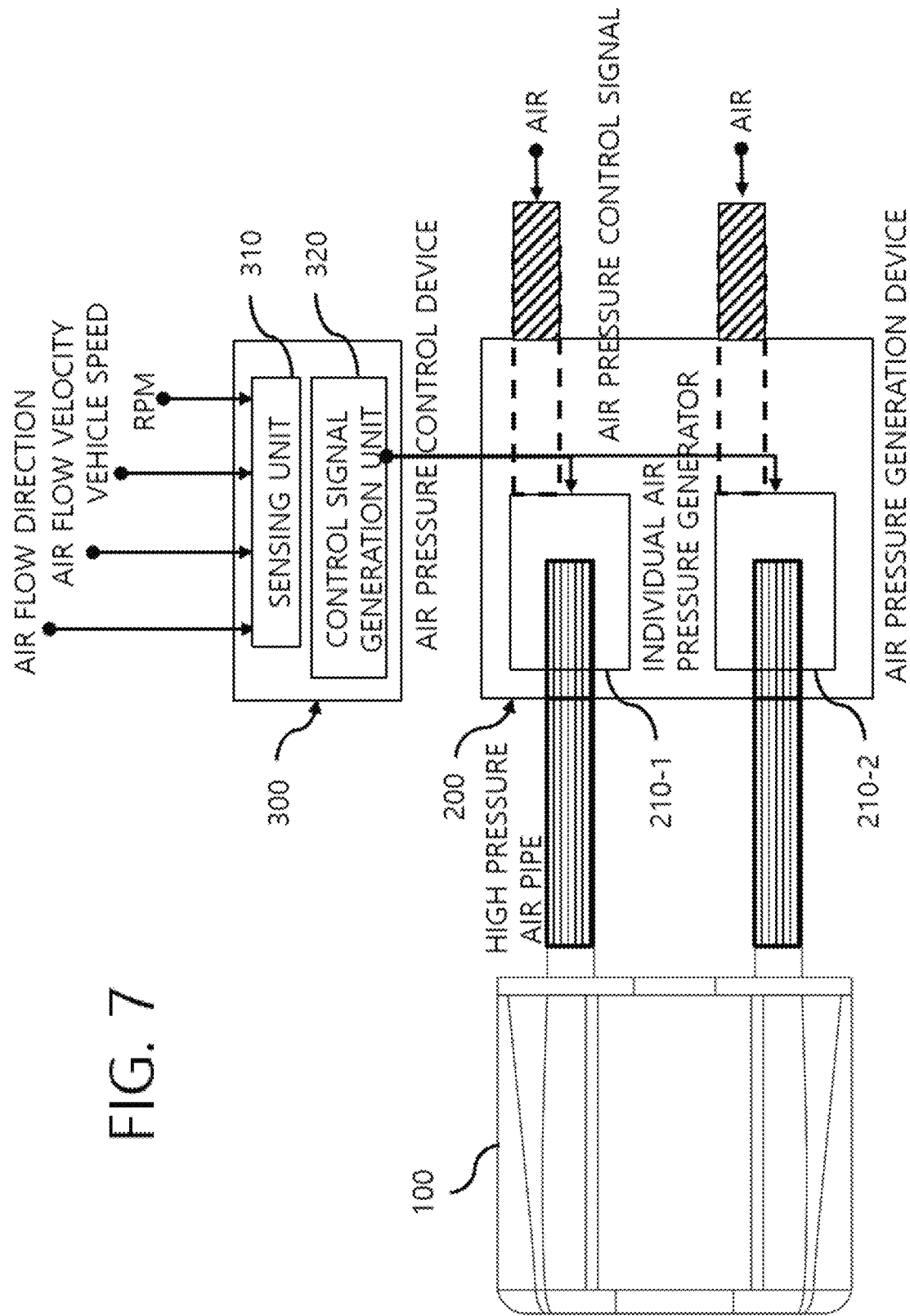
FIG. 7 is a view provided to explain an air housing system which uses the air housing apparatus.

FIG. 7 is a view provided to explain an air housing system using the air housing apparatus 100.

Referring to FIG. 7, the air housing system may include the air housing apparatus 100 described above with reference to FIGS. 1 to 6, an air pressure generation device 200 connected to the air housing apparatus 100 to provide high-pressure air, and an air pressure control device 300 to control the air pressure generation device 200.

The air housing apparatus 100 is the same as described above with reference to FIGS. 1 to 6, and a detailed description thereof is omitted.

The air pressure generation device 200 may include a plurality of air pressure generators 210 to individually generate air of air pressure, and a plurality of high-pressure air pipes 220 connected to the air pressure generators 210-1, 210-2 and the air housing apparatus 100 to supply high-pressure air to the air housing apparatus 100.

The respective air pressure generators 210-1, 210-2 may individually operate according to a control signal transmitted from the air pressure control device 300, and may control discharge pressure of air supplied to the air housing apparatus 100.

Although two air pressure generators 210-1, 210-2 are illustrated for convenience of explanation, the number of air pressure generators may be implemented variously according to a structure and a dimension of the optical device, and the same number of high-pressure air pipes 220 as the air pressure generators 210 may be implemented.

The air pressure control device 300 may acquire information regarding a driving condition of the vehicle or an air flow direction, an air flow velocity, and may variably adjust the discharge pressure of supplied air, based on the information, such that energy consumption efficiency can be enhanced, and simultaneously, an air dome (or air cover) can be effectively generated.

In addition, the air pressure control device 300 may variably adjust pressure of each high-pressure air pipe 220, thereby enabling a more effective air dome to be formed to protect the optical device according to various surrounding circumstances.

To achieve this, the air pressure control device 300 may include a sensing unit 310 provided with various sensors to acquire information on a speed of the vehicle, RPM, a, parking, stopping condition, strength of ambient air (an air flow velocity) including natural wind and vehicle air generated by driving of the vehicle, an air flow direction, and a control signal generation unit 320 to acquire the information on the speed of the vehicle, RPM, parking, stopping condition from the vehicle or the sensing unit 310, and to generate a control signal for controlling discharge pressure of air provided by the air pressure generation device 200.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. An air housing apparatus comprising:
   a cover configured to allow high-pressure air to be injected therethrough;
   an air guide configured to spray the high-pressure air toward a front surface of a lens; and
   an air housing provided to connect the cover and the air guide, and to deliver the high-pressure air supplied from the cover to the air guide,
   wherein the air housing comprises a housing passage provided therein and extended in a longitudinal transfer direction to provide a transfer path of air to be transferred, and
   wherein the housing passage is formed to have an air passage in a straight line with a diameter gradually decreasing along the longitudinal transfer direction from a starting portion up to an ending portion of the housing passage to increase a flow velocity of the transferred air.

2. The air housing apparatus of claim 1, wherein the air housing apparatus is configured to perform roles of a glass cover for the lens and a protective housing for protecting the lens from contaminants by spraying the high-pressure air onto the front surface of the lens of a vehicle-mounted optical device inserted thereinto.

3. The air housing apparatus of claim 1, wherein the cover comprises an air injection port to perform a role of a rear surface cover, and simultaneously, to perform a role of a connector to connect a high-pressure air pipe and a protective housing for protecting the lens from contaminants.

4. The air housing apparatus of claim 1, wherein the air guide comprises a guide passage provided therein to allow the high-pressure air supplied through the air housing to pass therethrough, and simultaneously, to guide the air in a spraying direction.

5. The air housing apparatus of claim 4, wherein the guide passage is configured to adjust the spraying direction of the air to spray the air at an angle suitable for an optical device.

6. An air housing system comprising:
   an air housing apparatus configured to perform roles of cover glass and a housing for protecting a lens from contaminants by spraying high-pressure air toward a front surface of the lens of a vehicle-mounted optical device inserted therein;

an air pressure generation device connected to the air housing apparatus to provide the high-pressure air; and an air pressure control device configured to control discharge pressure of air provided by the air pressure generation device, based on information on a driving speed of the vehicle, RPM, or an air flow direction and an air flow velocity, wherein the air housing comprises a housing passage provided therein and extended in a longitudinal transfer direction to provide a transfer path of air to be transferred, and wherein the housing passage is formed to have an air passage in a straight line with a diameter gradually decreasing along the longitudinal transfer direction from a starting portion up to an ending portion of the housing passage to increase a flow velocity of the transferred air.

7. The air housing system of claim 6, wherein a cover of the air housing apparatus comprises an air injection port to perform a role of a housing rear surface cover, and simultaneously, to perform a role of a connector to connect a high-pressure air pipe and the housing.

8. The air housing system of claim 6, wherein an air guide of the air housing apparatus comprises a guide passage provided therein to allow the high-pressure air supplied through the air housing to pass therethrough, and simultaneously, to guide the air in a spraying direction.

9. The air housing system of claim 8, wherein the guide passage is configured to adjust the spraying direction of the air to spray the air at an angle suitable for the optical device.

* * * * *